INVENTOR
Robert N. Smith

Feb. 19, 1963 R. N. SMITH 3,077,935
TRACTOR MOUNTED CULTIVATOR
Filed Aug. 22, 1961 2 Sheets-Sheet 2
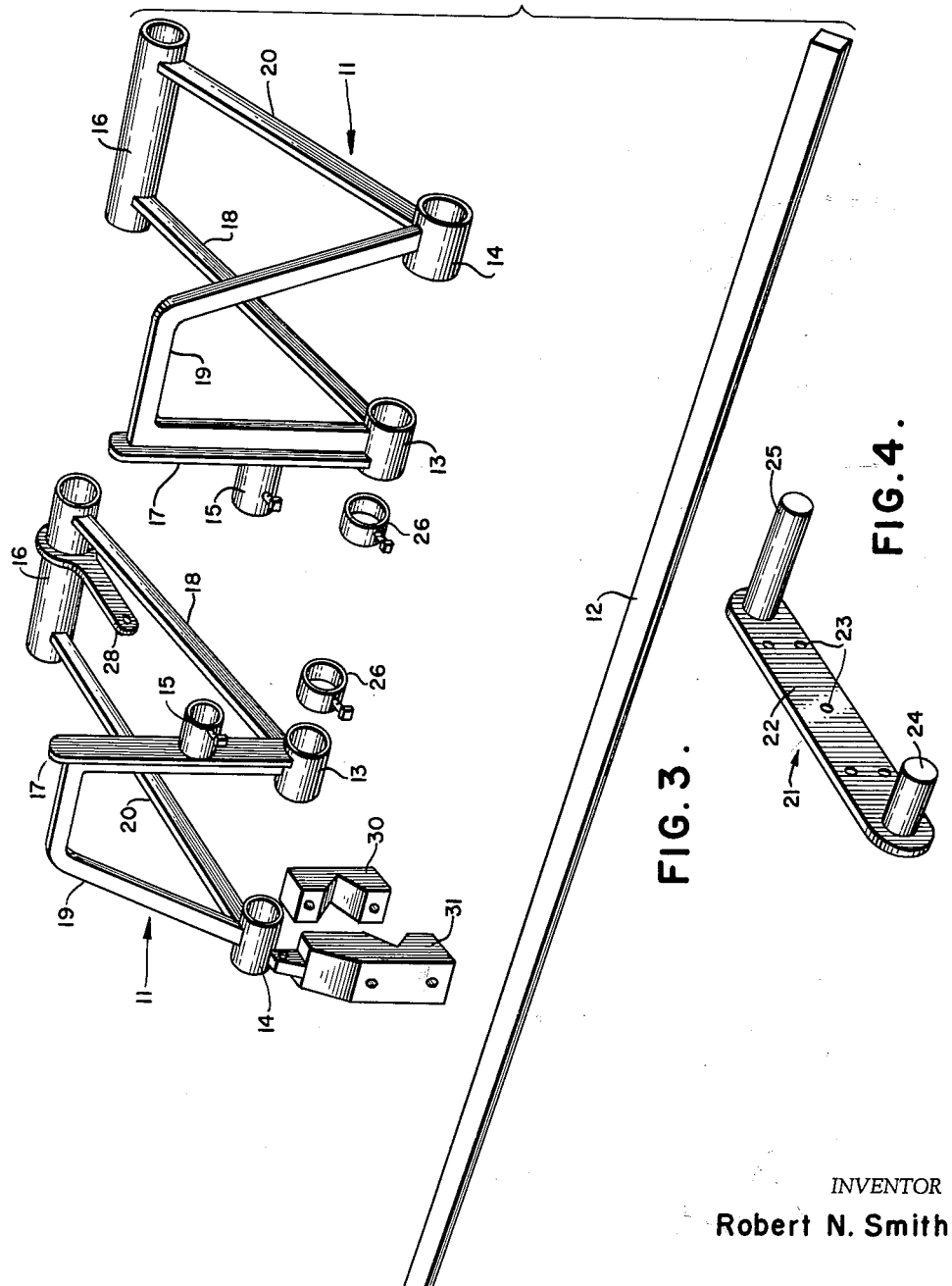
INVENTOR
Robert N. Smith
BY *Beale and Jones*
ATTORNEYS

3,077,935
TRACTOR MOUNTED CULTIVATOR
Robert N. Smith, 62 Barton St., Presque Isle, Maine
Filed Aug. 22, 1961, Ser. No. 133,180
5 Claims. (Cl. 172—273)

This invention relates generally to agricultural implements and more particularly to means for attaching a tool supporting bar on a tractor between the front and rear wheels thereof.

The general nature of the present invention resides in the provision of new and useful mounting means for attaching a cultivator to a tractor. The mounting device of the invention is shown for use with four-wheel tractors, particularly tractors wherein the spacing between the front wheels, as well as the rear wheels, is relatively great, although the mounting device can be used on other types of tractors.

It is the principal object of this invention to provide a cultivator attaching device for a tractor that is constructed to be quickly attachable and detachable.

Another object of this invention is the provision of a novel attaching device having few parts and which will securely mount a cultivator on a tractor between the front and rear wheels thereof.

A further object of the present invention is the provision of an attaching device for rotatably mounting a tool supporting bar on a tractor so the same may be actuated by hydraulic means.

A still further object of the present invention is the provision of a novel attaching device for a tractor which is simple to construct, inexpensive to manufacture, and which will be extremely durable and trouble free in operation.

This invention embodies other novel features, details of construction and arrangement of parts which are hereinafter set forth in the specification and claims, and illustrated in the accompanying drawings, wherein:

FIG. 3 is an enlarged perspective view showing details of the attaching device; and FIG. 4 is a perspective view of an adapter for the attaching device.

Figure 1:
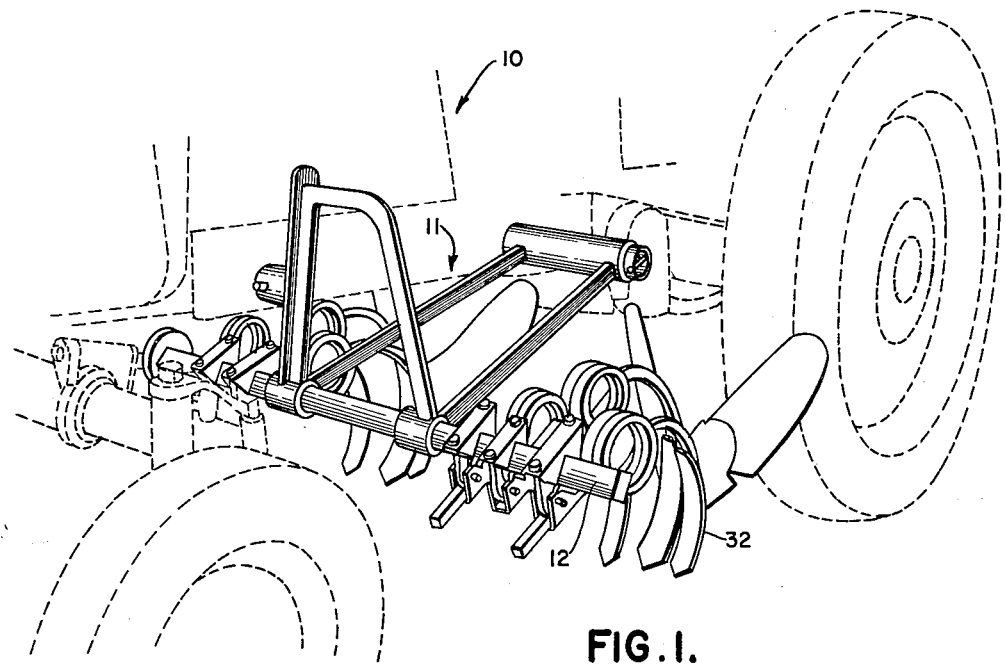
FIG. 1 is a perspective view showing the attaching device as seen from the left side of a tractor.
Figure 2:
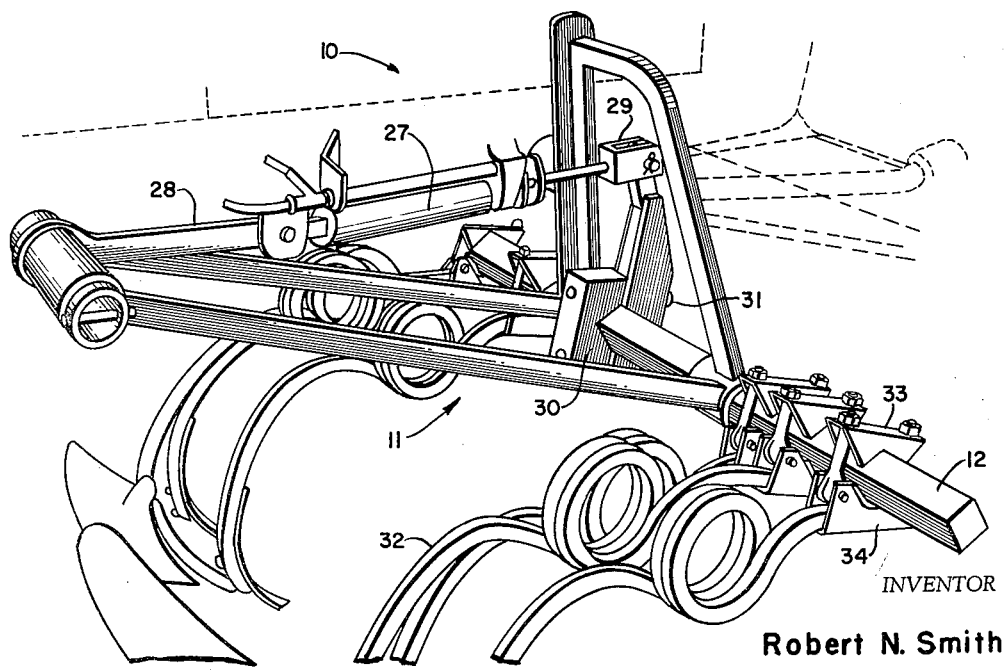
FIG. 2 is a perspective view showing the attaching device as seen from the right side of a tractor.

Generally and referring to the drawings, the attaching device is shown to be mounted on a tractor designated 10. Basically, the attaching device includes a pair of mounting brackets, generally designated 11. The brackets are adapted to be mounted on standards extending from each side of the tractor between the front and rear wheels thereof. Each mounting bracket is the opposite hand of the other, and they are otherwise identical in all respects except for an arm 28 which will be referred to below. A generally transversely disposed tool bar 12 is rotatably received in journals which are a part of the mounting brackets, and a plurality of cultivator implements can be secured to the tool bar. Hydraulic means is provided to rotate the tool bar for moving the implements into and away from their ground engaging or operative position.

More specifically and especially referring to FIG. 3 each mounting bracket 11 will be seen to include inner and outer journals 13 and 14, respectively, and forward and rearward sleeves 15 and 16, respectively. Inner and outer brace means are provided to suupport and maintain the journal members in their spaced apart relationship. The longitudinal axis of each journal member is collinear with the other for rotatably receiving the tool bar 12 which is preferably disposed at right angles to the direction of travel of the tractor. It will be realized that a single elongated journal member could be used in lieu of the separate inner and outer journals 13 and 14. The inner brace means includes the vertically disposed bar 17 and the inclined bar 18. The bar 17 is secured intermediate its ends to the forward sleeve 15 and its lower end is secured to the inner journal 13. The inclined bar 18 has its lower end attached to the inner journal 13 and its upper end secured to the rearward sleeve 16 at the inner portion thereof. The outer brace means includes the inverted generally U-shaped bar 19 and a second inclined bar 20. The innermost leg of the bar 19 is attached to the vertically disposed bar 17 along the length thereof, and the end of this leg of the bar 19 is secured to the inner journal 13. The outermost leg of the bar 19 has its end attached to the outer journal 14. Similar to the bar 18 the second inclined bar 20 has its lower end secured to the outer journal 14 and its upper end attached to the rearward sleeve 16 at the outer portion thereof. All parts of the mounting bracket are made of steel, and the device is preferably welded together to form a sturdy, one piece unit.

The longitudinal axis of the sleeves 15 and 16 are parallel, and each sleeve is adapted to receive a standard which extends outwardly from the side of the tractor. On some tractors, such as those manufactured by the Oliver Corporation, these standards are provided as standard equipment on the tractors. When it is desired to use the attaching device of this invention on a tractor not having these standards or posts, it is only necessary to attach an adapter 21 (see FIG. 4) to each side of the tractor.

The adapter 21 includes a longitudinally extending plate 22 having a plurality of apertures 23 therein adapting it to be secured to the framework of the tractor. Secured to the forward end of the plate 22 is a standard 24 which is received by the sleeve 15. At the rearward end of the plate 22 is secured a second and longer standard 25 which is received by the sleeve 16.

When it is desired to attach an implement, such as a tool bar having a plurality of cultivating teeth secured thereto, to a tractor between the front and rear wheels thereof, the mounting brackets 11 of this invention are first attached to the sides of the tractor by sliding the sleeves 15 and 16 over the standards provided with the tractor. As stated above if the tractor is not equipped with these standards, it is only necessary to fasten an adapter 21 to each of its sides. The mounting brackets can be quickly secured in place on the standards by the use of set-screws, cotter-pins, etc. After both mounting brackets are attached in place, the tool bar 12 is inserted in the journals 13 and 14 to its desired position. Normally the tool bar is mounted so that it has an equal portion extending from both sides of the tractor. The tool bar 12 is prevented from shifting laterally by the use of a pair of collars and set-screws designated 26. Next, a tractor powered, hydraulic actuating mechanism including the hydraulic cylinder 27 is connected in place. One of its ends is secured to the arm 28 which is swingably mounted on the bracket sleeve 16. The arm 28 may be a one piece member having an enlarged opening at one of its ends for receiving the sleeve 16, and it may be assembled in place during fabrication of the right-hand bracket member. However, it may include a collar assembly adapting it to be detachably mounted on the bracket 11. Of course it will be realized that the hydraulic actuating means may be connected on either side of the tractor depending on individual preferences or requirements. The piston rod assembly 29 of the hydraulic cylinder is bolted to the blocks 30, 31 which are, in turn, bolted to the tool bar 12. Finally, a plurality of tools 32 are bolted at their desired positions along the tool bar 12 by means of the blocks 33, 34. The hydraulic actuating mechanism is controlled by the tractor operator to swing the various tools into and away from their ground engaging or operative position.

Thus it is seen that by this invention new and useful attaching means is provided to quickly and easily mount cultivator implements to a tractor. Inexpensive means is provided to mount a cultivator between the front and rear wheels of a tractor. The novel attaching device of this invention can be mounted on tractors having laterally extending standards as part of their original equipment, and it may be mounted on other tractors by using the simple and inexpensive adapters which can be secured to each side of the tractor. Few parts are required and the device is extremely durable and sturdy.

While the invention has been shown in but its preferred form, it is obvious to those skilled in the art that it is not so limited, but is susceptible of various changes and modifications without departing from the spirit and scope of the claimed invention.

I claim:

1. In an attaching device for rotatably mounting a tool-bar on a tractor between the front and rear wheels thereof; the combination of a pair of longitudinally spaced standards extending horizontally from each side of the tractor; and a mounting bracket for each side of the tractor and each having a pair of sleeves adapted to receive the standards on one side of the tractor; each of said mounting brackets comprising inner and outer journal members maintained in a horizontal spaced apart relationship by inner and outer brace means, respectively, the longitudinal axis of each of said journals being collinear with each other and extending transversely to the direction of travel of said tractor; said inner brace means comprising a vertical bar attached intermediate its ends to the forwardmost of said sleeves and having its lower end attached to said inner journal member, and an inclined bar having one of its ends attached to the rearwardmost of said sleeves and having its other end attached to said inner journal member; said outer brace means comprising an outwardly and downwardly extending bar having its upper end attached to the upper end of said vertical bar and having its lower end attached to said outer journal member, and a second inclined bar having one of its ends attached to the rearwardmost of said sleeves and having its other end attached to said outer journal member; whereby a transversely extending tool bar may be rotatably mounted in all of said journals for supporting a plurality of tools.

2. The attaching device according to claim 1 wherein said standards are secured to a longitudinally extending plate adapted to be attached to the side of the tractor.

3. An attaching device for rotatably mounting a tool-bar on a tractor between the front and rear wheels thereof comprising; a pair of mounting brackets each having a pair of sleeves adapted to receive longitudinally spaced standards extending horizontally from each side of the tractor; each of said mounting brackets comprising inner and outer journal members maintained in a horizontal spaced apart relationship by inner and outer brace means, respectively, the longitudinal axis of each of said journals being collinear with each other and extending generally transversely to the direction of travel of said tractor; said inner brace means comprising a vertical bar attached intermediate its ends to the forwardmost of said sleeves and having its lower end attached to said inner journal member, and an inclined bar having one of its ends attached to the rearwardmost of said sleeves at the inner end thereof and having its other end attached to said inner journal member; said outer brace means comprising an outwardly and downwardly extending bar having its upper end attached to the upper end of said vertical bar and having its lower end attached to said outer journal member, and a second inclined bar having one of its ends attached to the rearwardmost of said sleeves at the outer end thereof and having its other end attached to said outer journal member; whereby a transversely extending tool bar may be rotatably mounted in all of said journals for supporting a plurality of tools.

4. The attaching device according to claim 3 wherein said mounting bracket includes an arm swingably mounted on the rearwardmost of said sleeves, said arm adapted to cooperate with hydraulic actuating means for imparting rotary movement to said tool bar.

5. An attaching device for rotatably mounting a tool bar on a tractor between the front and rear wheels thereof comprising; a pair of mounting brackets each having attachment means adapting them to be secured to the tractor one on each side thereof, each of said mounting brackets including a horizontally and transversely disposed journal member having its inner and outer ends supported from said attachment means by inner and outer brace means, respectively; said journals being collinear with each other; said inner brace means comprising a vertical bar connected intermediate its ends to said attachment means and having its lower end attached to the inner end of said journal member, and an inclined bar having one of its ends connected to said attachment means and having its other end attached to the inner end of said journal member; said outer brace means comprising an outwardly and downwardly extending bar having its upper end attached to the upper end of said vertical bar and having its lower end attached to the outer end of said journal member, and a second inclined bar having one of its ends connected to said attachment means and having its other end attached to the outer end of said journal member; whereby a transversely extending tool bar may be rotatably mounted in both of said journals for supporting a plurality of tools.

References Cited in the file of this patent

UNITED STATES PATENTS

| | | |
|---|---|---|
| 2,239,332 | Mee | Apr. 22, 1941 |
| 2,247,367 | Frudden et al. | July 1, 1941 |
| 2,335,175 | Davenport | Nov. 23, 1943 |
| 2,777,377 | Johnson et al. | Jan. 15, 1957 |

FOREIGN PATENTS

| | | |
|---|---|---|
| 948,563 | Germany | Sept. 6, 1956 |